Figure 2:
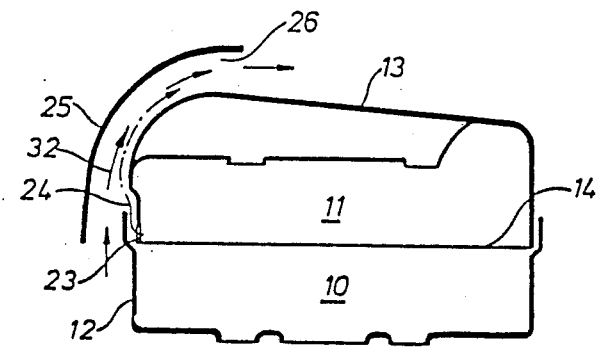

United States Patent [19]

Granath et al.

[11] Patent Number: 4,846,301

[45] Date of Patent: Jul. 11, 1989

[54] SILENCER

[75] Inventors: Håkan A. Granath, Taberg; Bror G. G. Pettersson, Jönköping, both of Sweden

[73] Assignee: Aktiebolaget Electrolux, Stockholm, Sweden

[21] Appl. No.: 177,124

[22] Filed: Apr. 4, 1988

[30] Foreign Application Priority Data

Apr. 14, 1987 [SE] Sweden .............................. 8701562

[51] Int. Cl.⁴ ........................... F01N 1/08; F01N 3/02
[52] U.S. Cl. ..................................... 181/230; 181/231; 181/243; 181/262; 181/272; 181/282
[58] Field of Search ............... 181/212, 225, 230, 243, 181/262, 263, 272, 282, 231, 267

[56] References Cited

U.S. PATENT DOCUMENTS

| 4,142,607 | 3/1975 | Landwehr et al. | 181/229 X |
| 4,574,913 | 3/1986 | Fukuda | 181/256 X |
| 4,741,411 | 5/1988 | Stricker | 181/262 X |

Primary Examiner—B. R. Fuller
Attorney, Agent, or Firm—Alfred E. Miller

[57] ABSTRACT

The silencer according to the invention contains two chambers (10,11) separated by a partition wall (14) and includes also a guide plate (25) guiding cooling air from a fan (27) through a channel (26) in which recesses (23) from one chamber terminate. By means of an ejecting function, then being formed, exhaust gases are evacuated into the channel and mixed with the cooling air to a lower temperature.

5 Claims, 2 Drawing Sheets

SILENCER

The present invention relates to a silencer for small engines in portable engine-driven tools, e.g. clearing saws.

When using engines in the open air there is a risk of igniting inflammable material close to the gas outlet of the engine, if the exhaust gases are permitted to contain glowing particles which might cause fire. In order to reduce the fire risk stipulations have been issued stating the requirements for approval of such engines for use in woods and fields. Thus, a silencer should contain a spark trap or the like and have an arrangement for lowering the gas temperature. The simplest form of a spark trap is a net in a passage opening between different chambers of the silencer while, on the other hand, the arrangement for a temperature reduction can be much more complicated. Such a complicated arrangement is known, for instance, from the German publication DE-OS No. 29 29 965.

By the present invention an arrangement of silencer is presented where, by means of an ejector function, the exhaust gases are ejected from a silencer chamber through a gap and mixed up with cooling air from the engine to a lower temperature. Besides the gap mentioned a guide shield is used which, on the one hand, catches the cooling air and on the other hand forms an outlet for the gas mixture at a lower temperature. A silencer designed according to the invention shall in this way have the features indicated more in detail in claim 1.

Figure 3:
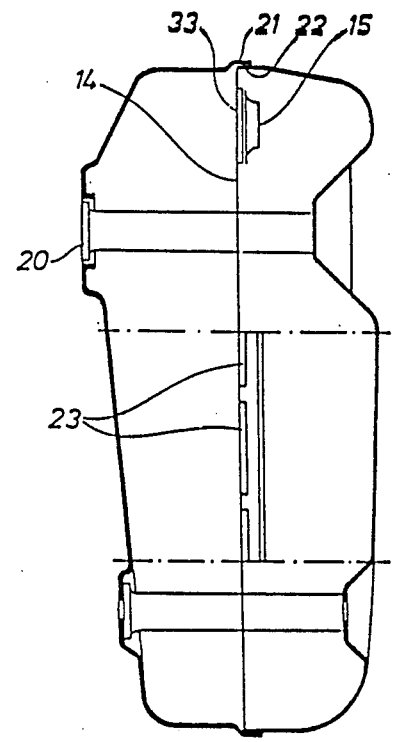
Figure 4:
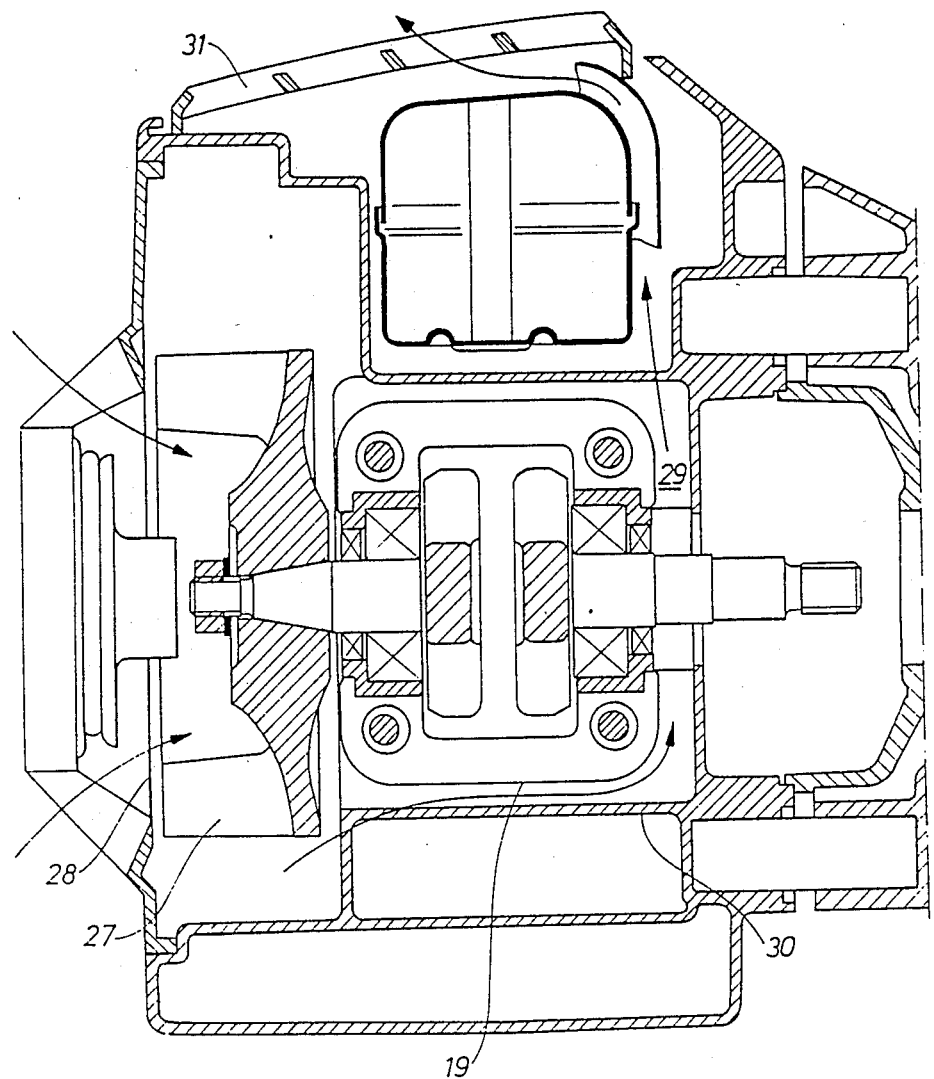

An embodiment of the invention is described in the following with reference to the accompanying drawings, which show in FIG. 1 a vertical projection of the silencer according to the invention, FIG. 2 a horizontal section of the silencer at the line II—II in FIG. 1, FIG. 3 a side projection of the silencer with cross section at III—III in FIG. 1, FIG. 4 the location of the silencer in a chain saw with a cooling fan and a way for cooling air.

Figure 1:
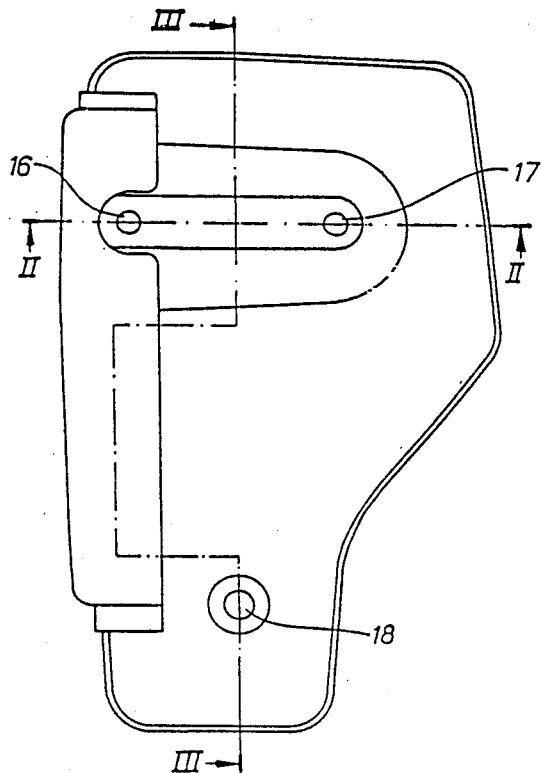

FIG. 1 shows a complete silencer in a preferred embodiment, suitable to be used in a chain saw. The silencer has two chambers 10, 11 which are principally located in a pair of metal shells 12 and 13, respectively, put together into a unit. Between the chambers there is a partition wall 14 through which the chambers communicate via a passage opening 15. The silencer is mounted by means of three through screws in the holes 16, 17, 18 onto an engine body 19 (FIG. 4). The exhaust gases then enter into the chamber 10 through a gate 20 between the two upper holes 16, 17. The metal shells are kept together by the screws which provide, when being tightened, a compact connection between the silencer and the exhaust gate of the engine.

The joint between the metal shells has a special shaping according to FIG. 2. On the outer edge of the shell 12 a flange 21 has been carried out which surrounds the whole shell. The flange overlaps the lower edge of the shell 13 providing a flange 22 turned inwards. In this flange there are some recesses 23 made along a long side of the shell 13. Through these recesses chamber 11 is connected to the environment so that the exhaust gases thereby can leave the chamber. Thanks to parallelism between the flanges 21, 22 the gas is guided a way which leads along the outside of the shell 13 (along the outlet arrow 24).

The indicated way along the arrow 24 has also been created by means of a guide plate 25 located outside the corner of the shell 13 and forming in that way a channel 26 with limit surfaces in the guide plate and the outside of the shell. As appears in FIG. 4, the engine has a cooling fan 27 which runs an air current from an inlet opening 28 through an engine room 29, limited by a casing 30, to an outlet opening 31 close to the silencer. Prior to the outlet through the opening the air passes the silencer and a part of the air current takes its way through the channel 26 (see arrow 32, FIG. 2). The air through the channel provides an ejecting function on the exhaust outlet along the arrow 24 and decreases the resistance in the exhaust channel. Thanks to the bending of the channel round the corner of the silencer a turbulence is created in it which acts for a good mixture of gas and air.

The spark trap mentioned in the introduction consists in the example described of a wire net 33 in the passage opening 15. Thanks to the net the glowing particles called sparks will remain in the chamber 10. Instead of the recesses 23 there will probably also be a possibility of carrying out inward bends in the flange 22 through which the exhaust gases may escape.

We claim:

1. In a silencer arrangement for a combustion engine in a portable, engine-driven tool, wherein the silencer is comprised of first and second chambers formed by first and second metal shells respectively, said first and second shells having first and second edge flanges respectively, said shells being joined together to form a joint wherein said first flange is adjacent to and inwardly of said second flange, the improvement wherein said first flange as recesses or inward bends defining at least one passageway communicating between said first chamber and an environment external of said first and second chambers.

2. The silencer arrangement according to claim 1, further comprising a guide plate mounted over the joint in at least a part thereof adjacent said passageway, said guide plate forming a channel together with an outside of said first shell.

3. The silencer arrangement according to claim 2, wherein said first shell has a first corner that is nearer to said passageway than any other corner thereof, and the guide plate extends from said joint around said first corner.

4. The silencer arrangement according to claim 1, further comprising a partition wall within said shells and separating said chambers, a passage opening in said partition wall, and a metal wire net covering said passage opening.

5. The silencer arrangement according to claim 2, further comprising a cooling system of a combustion engine, for generating a flow of cooling air, said channel having an inlet for receiving said cooling air to direct said cooling air to flow in said channel in the same direction as air entering said channel from said passageway.

* * * * *

UNITED STATES PATENT AND TRADEMARK OFFICE
CERTIFICATE OF CORRECTION

PATENT NO. : 4,846,301

DATED : July 11, 1989

INVENTOR(S) : HAKAN A. GRANATH and BROR G. G. PETTERSSON

It is certified that error appears in the above-identified patent and that said Letters Patent is hereby corrected as shown below:

In Claim 1, line 9, the word "as" should be --has-- .

Signed and Sealed this

Eighth Day of May, 1990

Attest:

HARRY F. MANBECK, JR.

*Attesting Officer*     *Commissioner of Patents and Trademarks*